United States Patent [19]
Snitzer et al.

[11] 3,731,226
[45] May 1, 1973

[54] LASER USING PHOSPHATE BASE LASER GLASS

[75] Inventors: Elias Snitzer, Wellesley; Robert E. Graf, Southbridge, both of Mass.

[73] Assignee: American Optical Corporation, Southbridge, Mass.

[22] Filed: Nov. 10, 1971

[21] Appl. No.: 197,394

Related U.S. Application Data

[63] Continuation-in-part of Ser. No. 80,458, Oct. 13, 1970, abandoned, which is a continuation of Ser. No. 712,744, March 13, 1968, abandoned.

[52] U.S. Cl. .................................. 331/94.5, 330/4.3
[51] Int. Cl. ............................................. H01s 3/16
[58] Field of Search ..................... 331/94.5; 330/4.3; 252/301.4

[56] References Cited

UNITED STATES PATENTS 3,250,721   5/1966   Paolis ................................. 331/94.5
3,533,956   10/1970  Snitzer ............................... 331/94.5

OTHER PUBLICATIONS

Snitzer et al.; Phosphate Glass Er + Laser. IEEE J. Quant. Elect., QE-4 (May 1968) pg. 360.
Robieux et al., High Brightness Glass Lasers, IEEE, J. Quant. Elec., QE-4 (May 1968) pg. 360.
Young, Report on Glass Lasers. Microwaves–Laser Technology Section, July 1968, pp. 69–78.

*Primary Examiner*—William L. Sikes
*Attorney*—William C. Nealon et al.

[57] ABSTRACT

A laser device uses a material for incorporating into a glass laser host consisting essentially of a phosphate glass composed principally of an erbium metaphosphate admixed with an ytterbium metaphosphate. The properties of the glass may be varied by additional $R(PO_3)_3$ and $S(PO_3)_2$ contents wherein said R is a trivalent ion selected from the group consisting of aluminum, lanthanum, gadolinium, gallium, scandium, yttrium, neodymium, cerium, europium, manganese, molybdenum and chromium, and said S is a divalent ion selected from the group consisting of zinc, magnesium, cadmium, calcium, strontium or barium. The resulting glass composition provides a material capable of producing laser emission from the erbium ion at a wavelength of 1.536 microns, when disposed in a resonant cavity having an output reflector whose reflectance is a maximum of 80 percent.

5 Claims, 1 Drawing Figure

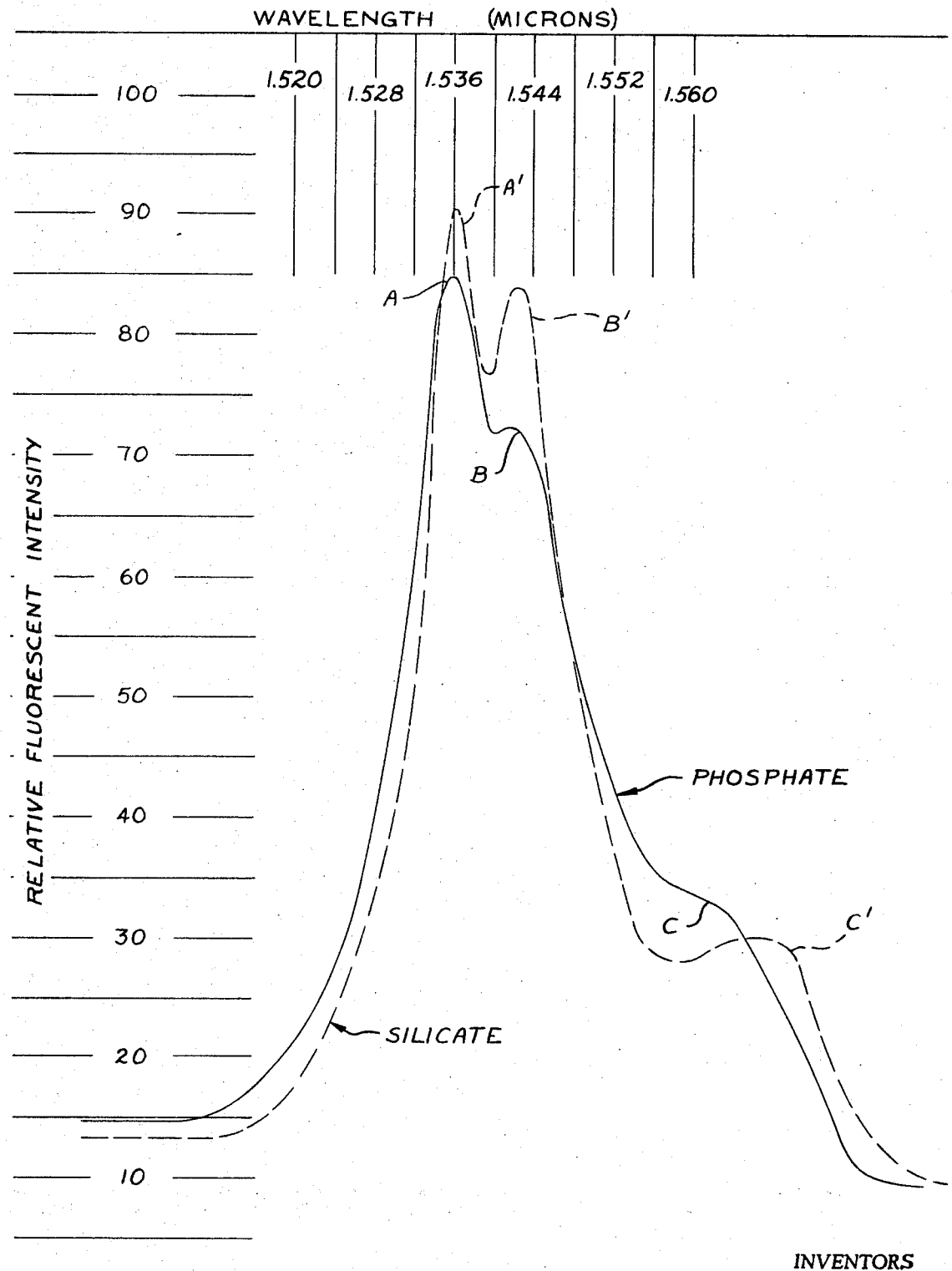

LASER USING PHOSPHATE BASE LASER GLASS

CROSS-REFERENCE TO RELATED APPLICATIONS

This application is a continuation-in-part of our previously filed application, Ser. No. 80,458, filed Oct. 13, 1970, which is now abandoned, and which, in turn, was a continuation of our previously filed application, Ser. No. 712,744, filed Mar. 13, 1968, which is now abandoned.

BACKGROUND OF THE INVENTION

1. Field of The Invention
Laser devices.
2. Description of The Prior Art

Many materials have been suggested as hosts for laserable ions. In addition to phosphates, the list includes silicates, borates, borosilicates, arsenic trisulphide, selenides, chlorides, fluorides, oxifluorides, alumino-silicates, germanates and many organic glasses. However, by providing a phosphate glass host for erbium as the lasing ion, pumped in part by ytterbium as the sensitizer ion, laser action occurs at a wavelength of 1.536 microns in a suitable resonant cavity, the shortest wavelength to be reported. In a similarly doped silicate base glass laser, for example, the erbium laser emission is at 1.543 microns.

SUMMARY

This invention relates generally to laser devices and more particularly to a novel composition for an erbium doped glass laser. The composition is essentially an erbium metaphosphate. In many applications of erbium lasers it is important to have laser action occur at as short a wavelength as possible, as for example in a range finder. By providing a phosphate base glass host for erbium, laser action occurs at 1.536 microns when utilized in a resonant cavity, the output reflector of which has a maximum reflectance of 80 percent. In addition, it has been found that by providing a phosphate base, a glass having a low coefficient of thermal expansion is produced.

Therefore, it is an object of this invention to provide a host material and resonant cavity configuration for the erbium ion with resulting laser emission for erbium at 1.536 microns.

A further object of this invention is to provide a laserable material having a low coefficient of expansion.

BRIEF DESCRIPTION OF THE DRAWING

The single FIGURE of the drawing is a graph showing the fluorescence spectra for trivalent erbium in phosphate and silicate base glasses at room temperature.

DESCRIPTION OF THE PREFERRED EMBODIMENTS

Lasers, otherwise referred to as optical masers, are light-amplifying or light-producing devices and are specifically adapted to provide an output of high intensity, coherent monochromatic light. Such light is produced in a laser (an acronym for *l*ight *a*mplification by *s*timulated *e*mission of *r*adiation) by photonic emission from the so-called active atoms or ions of a body or core composed of a so-called laser material. With a laserable quantity of erbium ions in a phosphate base incorporated into a glass laser host, laser action from the erbium ions occurs at a wavelength of 1.536 microns. Although it is possible to obtain laser action at liquid nitrogen temperatures, in a phosphate glass formed solely of $P_2O_5$ and $Er_2O_3$ as batch constituents, greater laser efficiency can be obtained by using a laser ion of erbium and a so-called "sensitizing ion" in the host material to help pump the laser ion. In this invention an ytterbium ion is used as the sensitizing ion to transfer energy from a flash tube to the erbium ion. This teaching is fully disclosed in U. S. Pat. application Ser. No. 420,280, assigned to the assignee of the instant application and forms no part of the present invention. However, the teachings contained in said application are incorporated into the present disclosure. In that application, trivalent ytterbium is pumped by a flash tube from an initial ground level to a higher level with the ground level designated as $^2F_{7/2}$, and the upper level $^2F_{5/2}$ in spectroscopic notation. An energy transfer then takes place from the upper level of the trivalent ytterbium to the upper $^4I_{11/2}$ of trivalent erbium. A nonradiative transition then occurs from the $^4I_{11/2}$ level to the $^4I_{13/2}$ level of trivalent erbium. Subsequent transitions occur between energy levels $^4I_{13/2}$ and $^4I_{15/2}$ producing laser output. By providing a phosphate base glass composition in the concentrations that will be later explained, the laser emission takes place at 1.536 microns.

Preparation of the laser glass can be understood with reference to the following chemical reaction:

$$R_2O_3 + 3P_2O_5 \rightarrow 2R(PO_3)_3$$

In one embodiment of the invention, an erbium-ytterbium metaphosphate glass which produces laser emission at 1.536 microns, was prepared from the following batch constituents:

| | |
|---|---|
| $P_2O_5$ | 52% |
| $Yb_2O_3$ | 47.5% |
| $Er_2O_3$ | 0.5% |

Calculations have shown that there can be a deviation from the stoichiometry of the equations:

$$Er_2O_3 + 3P_2O_5 \rightarrow 2Er(PO_3)_3 \text{ and}$$

$$Yb_2O_3 + 3P_2O_5 \rightarrow 2Yb(PO_3)_3$$

in an amount represented by an excess or deficiency of 30 percent of $P_2O_5$, and still produce a laserable material with erbium lasing at 1.536 microns. Since phosphorous pentoxide ($P_2O_5$) is difficult to handle in a pure state, the desired amount of $P_2O_5$ can be calculated from the stoichiometric reaction of ammonium dihydrogen phosphate, $NH_4H_2PO_4$, shown below:

$$2NH_4H_2PO_4 \rightarrow P_2O_5 + 2NH_3 + 3H_2O$$

In addition to $Er_2O_3$ and $Yb_2O_3$ the trivalent constituents may also include one or more oxides from the group consisting of aluminum, lanthanum, gadolinium, gallium, scandium, yttrium, neodymium, cerium, europium, manganese, molybdenum and chromium, while still producing laser emission from erbium at 1.536 microns. A further constituent, one or more oxides of a divalent ion, SO, wherein S is selected from the group consisting of zinc, magnesium, cadmium, calcium, strontium and barium, may also be introduced into the batch. On heating, said SO content will produce a metaphosphate according to the following chemical reaction:

$$SO + P_2O_5 \rightarrow S(PO_3)_2$$

The addition of the above SO content to the batch has been found to change the physical properties of the glass without changing the wavelength at which the erbium will lase. Accordingly, aluminum oxide within the range of 0–20 weight percent may be introduced into the batch. The addition of aluminum oxide increases the glass's durability and stability and prevents crystallization or devitrification of the glass. In order to increase the fluxing properties of the glass, a zinc oxide content within the range of approximately 0–20 weight percent may also be introduced into the glass. A glass having the following batch composition was prepared:

|  | Weight |
|---|---|
| $Al_2O_3$ | 8.44% |
| $P_2O_5$ | 61.30% |
| ZnO | 14.66% |
| $Nd_2O_3$ | .20% |
| $Er_2O_3$ | .50% |
| $Yb_2O_3$ | 14.90% |

The glass prepared from the above batch constituents had an index of refraction of 589 nm of 1.52, a density of 2.95, and an expansion coefficient of 4.2 × $10^{-6}/ALC$.

Experimentally it has been determined that the concentration of erbium ions necessary for laser action is between the range of $10^{18}$ ions per cubic centimeter and $3 \times 10^{21}$ ions per cubic centimeter. Expressed in a weight percent, this range would be approximately between values of 0.01–30 weight percent of the oxide of $Er_2O_3$. Said range of erbium oxide in a phosphate base glass host contains a laserable quantity of erbium ions, and when erbium ions in said range in a phosphate base are incorporated within a glass laser host and pumped by an energy source such as a flash tube, a sufficient inversion in population between two energy levels results so as to provide enough gain in the laser wavelength of stimulated emission to overcome all light losses in said laser host material. The range for the concentration of ytterbium ions required for energy transfer to the erbium ions is between the values of approximately 0.01–55 weight percent of the oxide, but the total $Er_2O_3$ and $Yb_2O_3$ batch content cannot exceed approximately 70 weight percent. The efficiency of the glass can also be improved by more than a factor of 3, by the addition of small amounts of neodymium oxide ($Nd_2O_3$). It has been determined experimentally that the optimum $Nd_2O_3$ concentration is about 0.2 weight percent. Neodymium not only sensitizes the fluorescence of erbium but also quenches it, which is evident by the decrease in lifetime from 9.4 milliseconds for glass with a 0.5 weight percent $Er_2O_3$, 15 weight percent $Yb_2O_3$ and no $Nd_2O_3$ to 8.2 milliseconds for the addition of 0.2 weight percent of $Nd_2O_3$.

Erbium-phosphate laser glass can be successfully prepared from a batch having a $P_2O_5$ constituent within the range of approximately 30–90 weight percent.

The zinc oxide referred to earlier within said range of approximately 0–20 weight percent may be replaced by oxides of magnesium, cadmium, calcium, strontium and barium in a mole percent range corresponding to the mole percent range of approximately 0–20 weight percent of zinc oxide. Accordingly, said oxides of magnesium, cadmium, calcium, strontium and barium within the range of approximately 0–32 mole percent may be introduced into the batch.

The aluminum oxide content within the range of approximately 0–20 weight percent may be replaced by oxides of lanthanum, gadolinium, gallium, scandium, yttrium, neodymium, cerium, europium, manganese, molybdenum and chromium within the range of approximately 0–10 weight percent of the oxide.

Although we are, at present, uncertain as to the exact reason why a phosphate base host for erbium produces laser action at 1.536 microns, tests have indicated that with a phosphate base, laser action from the erbium ions occurs only at that wavelength when the output reflector for the resonant cavity has a reflectance of 80 percent or less. Referring to the drawing, there is shown the fluorescent spectra for trivalent erbium in a phosphate and in a silicate base glass. The spectrum for the phosphate base glass was obtained with an output mirror whose reflectance is approximately 60 percent which appears to be the ideal value. The silicate curve shows a peak labelled A' at 1.536 microns and a peak labelled B' at 1.543 microns. The phosphate curve also shows corresponding peaks labelled A at 1.536 microns and labelled B at 1.543 microns. If intensity were the only factor to consider, laser action would take place at the wavelength at which the fluorescent intensity is greatest. In this case, that is the A' intensity for the silicate and A for the phosphate, both of which are 1.536 microns. There is, however, another consideration. Laser emission tends to occur at the longer of two wavelengths. This effect is the result of the fact that the terminal state of the longer wavelength transition is slightly above the ground state. In the silicate base, the ratio of B'/A' intensities is more nearly equal to one than is the ratio of B/A intensities in the phosphate base. The result is that laser action from the erbium ions in a silicate base occurs in the B' line of 1.543 microns, whereas laser action from the erbium ions in a phosphate base occurs at 1.536 microns, that is, the A peak.

The drawing shows further peaks at C and C'. At liquid nitrogen temperature of 77°K there is no emission in these peaks. Above room temperature the peak indicated as C' for the silicate glass increases more rapidly with temperature than does the corresponding peak labelled C for the phosphate glass. The net result is that in the silicate base at a temperature approximating that of boiling water, laser emission discontinuously shifts from a value of 1.543 microns to approximately 1.57 microns. However, a phosphate base erbium laser does not show this instability and the wavelength of laser emission is stable at 1.536 microns and is independent of temperature up to 100°C.

The short wavelength of laser emission and temperature independence are very important features for an erbium laser. At present, an important use for an erbium laser is in a range finder. A range finder is an instrument that measures distance by determining the time interval it takes for a signal sent out to reach an object and reflect back to a detector. A range finder operates by the principle upon which radar in the microwave region operates. A range finder requires a Q-switched pulse and detector which is fast enough to follow the short duration Q-switched emission and a response time of a few nanoseconds. At present, the detector which appears to be most promising at this wavelength is a germanium diode. However, this detector shows a rapidly changing response characteristic in this wavelength region. The net result is that the efficiency for detecting radiation at 1.536 microns is better than detecting radiation at 1.543 microns by a factor of about 20 percent. The increase in detection efficiency leads to a corresponding decrease in the energy necessary for a given application. Also, if a laser discontinuously shifts from emission at 1.543 microns out to 1.57 microns, two problems are encountered. First, the detection efficiency is drastically reduced at the longer wavelength. Secondly, since it is desirable to use a narrow wavelength filter to discriminate against background light, the filter width would have to be wide enough to permit both the 1.543 and 1.57 micron lines to pass. Widening the filter would lead to a corresponding increase in the background light. These two problems are so undesirable in range finder applications that it is necessary to incorporate some means of temperature control which is extremely costly.

However by providing a phosphate base erbium laser in accordance with this invention, there is no discontinuous shifting of emission wavelength as the temperature increases.

We claim:

1. A laser device which uses a rod of glass material as host for the active ions, the rod being disposed in a resonant cavity, the improvement in which comprises the laser glass material consisting essentially of a laserable quantity of erbium ions in a phosphate base glass, ytterbium ions being present as sensitizer ions, the concentration of erbium ions being present in the range of approximately 0.01 to 30 weight percent on an oxide basis, ytterbium ions being present in a concentration in the range of approximately 0.01 to 55 weight percent on an oxide basis, total erbium and ytterbium on an oxide basis being less than approximately 70 weight percent, and the output reflector having a maximum reflectance of 80 percent thereby providing laser emission at a wavelength of 1.536 microns.

2. A laser device according to claim 1 wherein the glass material has a batch constituent of 52.0 weight percent $P_2O_5$, 47.5 weight percent $Yb_2O_3$, and 0.5 weight percent $Er_2O_3$.

3. A laser device according to claim 1 wherein the glass material includes an $Al_2O_3$ content within the range of approximately 0–20 weight percent and ZnO content within the range of approximately 0–20 weight percent.

4. A laser device according to Claim 1 wherein the glass material has the following batch constituents:

| | |
|---|---|
| $Al_2O_3$ | 8.44 weight percent |
| $P_2O_5$ | 61.30 weight percent |
| ZnO | 14.66 weight percent |
| $Nd_2O_3$ | .20 weight percent |
| $Er_2O_3$ | .50 weight percent |
| $Yb_2O_3$ | 14.90 weight percent |

5. A laser device according to claim 1 further characterized by the inclusion within the glass material of a divalent metal oxide within the range of approximately 0–32 mole percent wherein said divalent ion is selected from the group consisting of zinc, magnesium, cadmium, calcium, strontium, and barium and mixtures thereof, and a trivalent oxide within the range of approximately 0–10 weight percent, said trivalent ion being selected from the group consisting of lanthanum, gadolinium, gallium, scandium, yttrium, neodymium, cerium, europium, maganese, molybdenum, and chromium and mixtures thereof, and a $P_2O_5$ content within the range of approximately 30–90 weight percent.

* * * * *